United States Patent
Xiong et al.

(10) Patent No.: US 10,773,398 B2
(45) Date of Patent: Sep. 15, 2020

(54) ROBOT FOOT STRUCTURE AND HUMANOID ROBOT HAVING THE SAME

(71) Applicant: UBTECH Robotics Corp, Shenzhen (CN)

(72) Inventors: Youjun Xiong, Shenzhen (CN); Hailei Li, Shenzhen (CN); Guangjun Hei, Shenzhen (CN); Weining Zhang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 159 days.

(21) Appl. No.: 16/228,811

(22) Filed: Dec. 21, 2018

(65) Prior Publication Data

US 2019/0202071 A1 Jul. 4, 2019

(30) Foreign Application Priority Data

Dec. 29, 2017 (CN) .......................... 2017 1 1478420

(51) Int. Cl.
| | |
|---|---|
| *B25J 9/00* | (2006.01) |
| *B25J 19/00* | (2006.01) |
| *B25J 13/08* | (2006.01) |

(52) U.S. Cl.
CPC ......... *B25J 19/0091* (2013.01); *B25J 9/0006* (2013.01); *B25J 9/0009* (2013.01); *B25J 13/085* (2013.01)

(58) Field of Classification Search
CPC .... B25J 9/0006; B25J 9/0009; B25J 19/0091; B62D 57/032; A61F 2002/6614; A61F 2002/6635; A61F 2002/665; A63H 11/18
See application file for complete search history.

(56) References Cited

U.S. PATENT DOCUMENTS

| | | | | |
|---|---|---|---|---|
| 7,409,265 B2* | 8/2008 | Takenaka | ............... | B25J 13/085 180/8.1 |
| 7,525,275 B2* | 4/2009 | Ohta | .................... | B25J 19/0091 180/8.6 |
| 7,530,410 B2* | 5/2009 | Takenaka | ............. | B25J 19/0091 180/6.5 |
| 7,650,203 B2* | 1/2010 | Maslov | ................ | B25J 19/0091 700/245 |
| 7,756,605 B2* | 7/2010 | Hirose | ................... | B25J 13/085 700/245 |
| 2004/0244505 A1* | 12/2004 | Takenaka | ............... | B25J 13/088 73/862.541 |

(Continued)

*Primary Examiner* — Richard W Ridley
*Assistant Examiner* — Brian J McGovern (57) ABSTRACT

A robot foot structure for being used in conjunction with the main body structure of a humanoid robot is provided, the robot foot structure being connected to a bottom of the main body structure, wherein the robot foot structure includes a sole plate and a buffering mechanism provided on the sole plate, the buffering mechanism is configured to be connected between the sole plate and the main body structure of the humanoid robot for buffering a load acted on the robot foot structure generated by the weight of the main body structure during walking of the robot foot structure. A load generated by the weight of the main body structure during walking is acted on the buffering mechanism which in turn absorbs an impact resulted from the load as the robot foot structure touches the ground, such that the service life of the robot foot structure can be extended.

12 Claims, 5 Drawing Sheets

(56) References Cited

U.S. PATENT DOCUMENTS

2006/0106495 A1* 5/2006 Takenaka ............. B62D 57/032
700/253
2008/0297091 A1* 12/2008 Park .................... B62D 57/032
318/568.12

* cited by examiner

ROBOT FOOT STRUCTURE AND HUMANOID ROBOT HAVING THE SAME

CROSS REFERENCE TO RELATED APPLICATIONS

This application claims priority to Chinese Patent Application No. 201711478420.0, filed Dec. 29, 2017, which is hereby incorporated by reference herein as if set forth in its entirety.

BACKGROUND

1. Technical Field

The present application relates to a field of robot technology, and in particular to a robot foot structure and a humanoid robot.

2. Description of Related Art

A humanoid robot integrates multiple technologies such as electricity, materials, computers, sensors, and control technology, which is an important symbol representing high-tech strength and development level of a country. Accordingly, most of the countries make a heavy investment in development research of the humanoid robot technology.

The existing humanoid robot includes a main body structure provided with a shape of human body, and a robot foot structure connected to a bottom of the main body structure and providing a support for the whole weight of the humanoid robot. The humanoid robot can perform walking activities through the robot foot structure. During the walking activities of the humanoid robot, an impact loaded on the robotic foot structure when it touches the ground shortens the service life of the humanoid robot.

BRIEF DESCRIPTION OF THE DRAWINGS

In order to more clearly illustrate the technical solutions of the embodiments according to the present application, drawings used in the embodiments of the present application or the description of the prior art will be briefly introduced below. It should be appreciated that the drawings described below merely illustrate some embodiments of the present application, and other drawings may be obtained by those skilled in the art without departing from the scope of the drawings.

DETAILED DESCRIPTION

Embodiments of the present application are described in detail below with reference to the appending drawings. Equal and/or similar elements in the drawings can here be designated by equal and/or similar reference signs. The embodiments described below with reference to the drawings are intended to be illustrative of the application and are not to be construed as limiting the application.

In the description of the present application, when an element is referred to as being "provided in/on/at" a further element, it may be directly or indirectly in/on/at the further element. When an element is referred to as being "connected to" a further element, it may be directly or indirectly connected to the further element.

It should be understood that the terms "length", "width", "upper", "lower", "front", "rear", "left", "right", "vertical", "horizontal", "top", "bottom", "inside", "outside" and the like are based on the orientation or positional relationship shown in the drawings, and are merely for convenience of description of the present application and for a simplified description, rather than indicating or implying that the device or component referred to must have a particular orientation, or must be constructed or operated in a particular orientation, and thus are not to be construed as limiting the application.

Moreover, the terms "first" and "second" are used for descriptive purposes only and are not to be construed as indicating or implying a relative importance or implicitly indicating the number of technical features indicated. Thus, features defined by "first" and "second" may include one or more of the features either explicitly or implicitly. In the description of the present application, "a plurality" means two or more, unless it is specifically and specifically defined otherwise.

The specific meanings of the above terms in the present application can be understood by those skilled in the art on a case-by-case basis.

Figure 1:
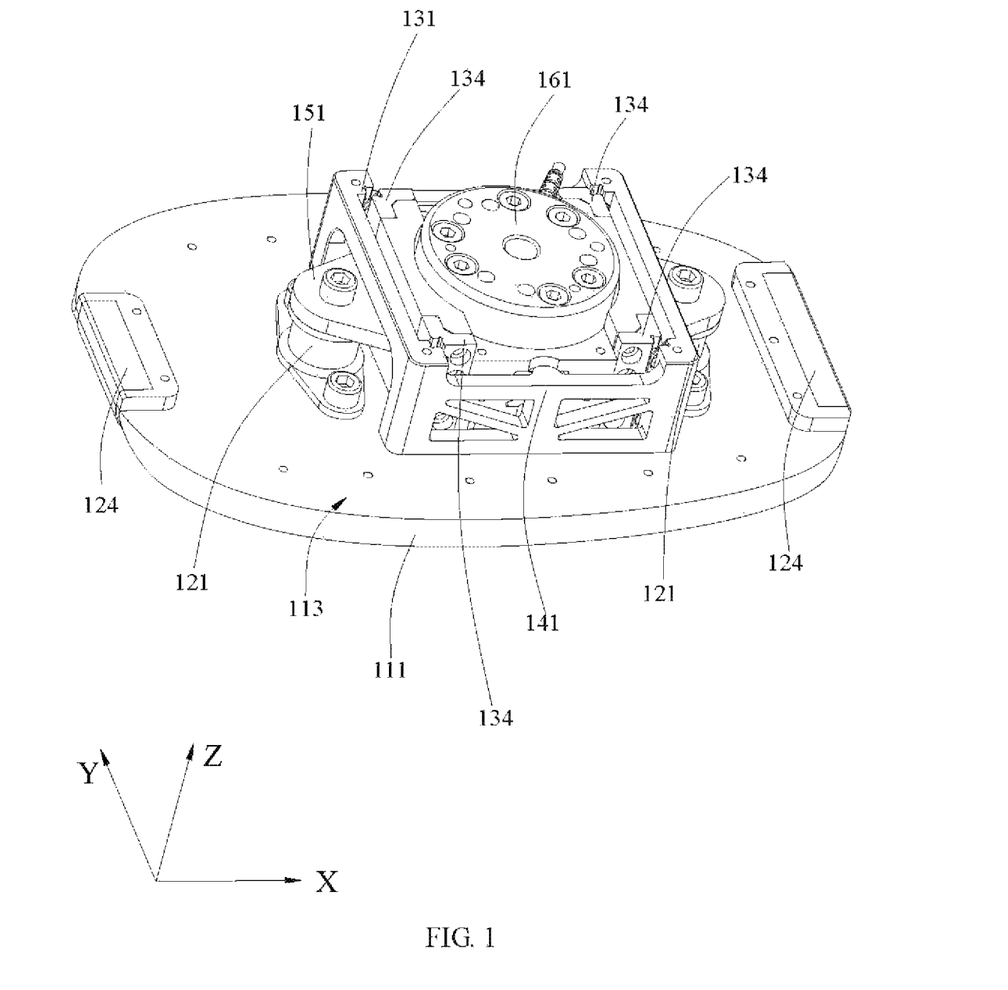
FIG. 1 shows a perspective view of a robot foot structure according to an embodiment of the present application.
Figure 2:
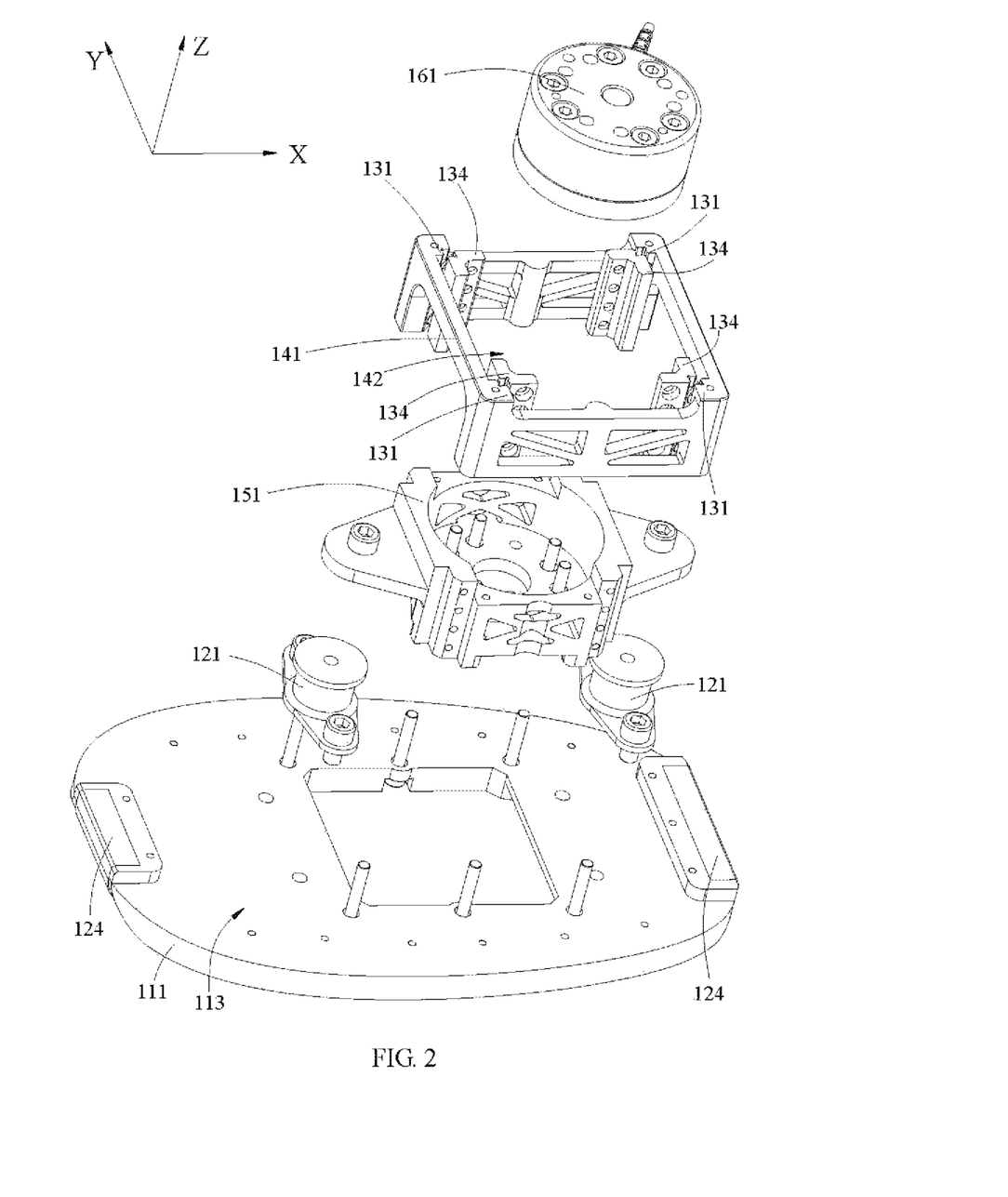
FIG. 2 shows an exploded view of the robot foot structure in FIG. 1.

It should be noted that, in the embodiment of the present application, according to a XYZ rectangular coordinate system established in FIG. 1 and FIG. 2, one side in the positive direction of the X-axis is defined as a rear side, and one side in the negative direction of the X-axis is defined as a front side, one side in the positive direction of the Y-axis is defined as a right side, and one side in the negative direction of the Y-axis is defined as a left side, one side in the positive direction of the Z-axis is defined as an upper side, and one side in the negative direction of the X-axis is defined as a lower side.

The present application will be further described below with reference to the accompanying drawings for more clearly and fully discussing the technical solutions of the present application.

As shown in FIGS. 1 to 4, a robot foot structure is provided according to an embodiment of the present application. The robot foot structure is configured to be connected to a bottom of a main body structure (not shown) of a humanoid robot for being used in conjunction with the main body structure. As shown in FIGS. 1 and 2, the robot foot structure includes a sole plate 111 and a buffering mechanism provided on the sole plate 111. The buffering mechanism is configured to be connected between the sole plate 111 and the main both structure of the humanoid robot for buffering a load acted on the robot foot structure generated by the weight of the main body structure during walking of the robot foot structure.

In the embodiment, the robot foot structure is used in conjunction with the main body structure of the humanoid robot. A load generated by the weight of the main body structure during walking of the robot foot structure is acted on the buffering mechanism which in turn absorbs an impact to the robot foot structure resulted from the load as the robot foot structure touches the ground. By this way, the service life of the robot foot structure can be extended.

Further, the buffering mechanism includes at least one buffer 121 for buffering a compressional force between the main body structure of the humanoid robot and the sole plate 111. The buffer 121 includes a lower part fixedly connected to the sole plate 111 and an upper part connected to the main body structure and configured to perform a damping movement with respect to the lower part.

In the embodiment, a load generated by the weight of the main body structure of the humanoid robot is acted on the upper part of the buffer 121, and the buffer 121 in turn absorbs an impact energy resulted from the load during walking of the robot foot structure, such that the robot foot structure can be prevented from being rigidly impacted by the main body structure, and thus the service life of the robot foot structure can be extended.

Figure 3:
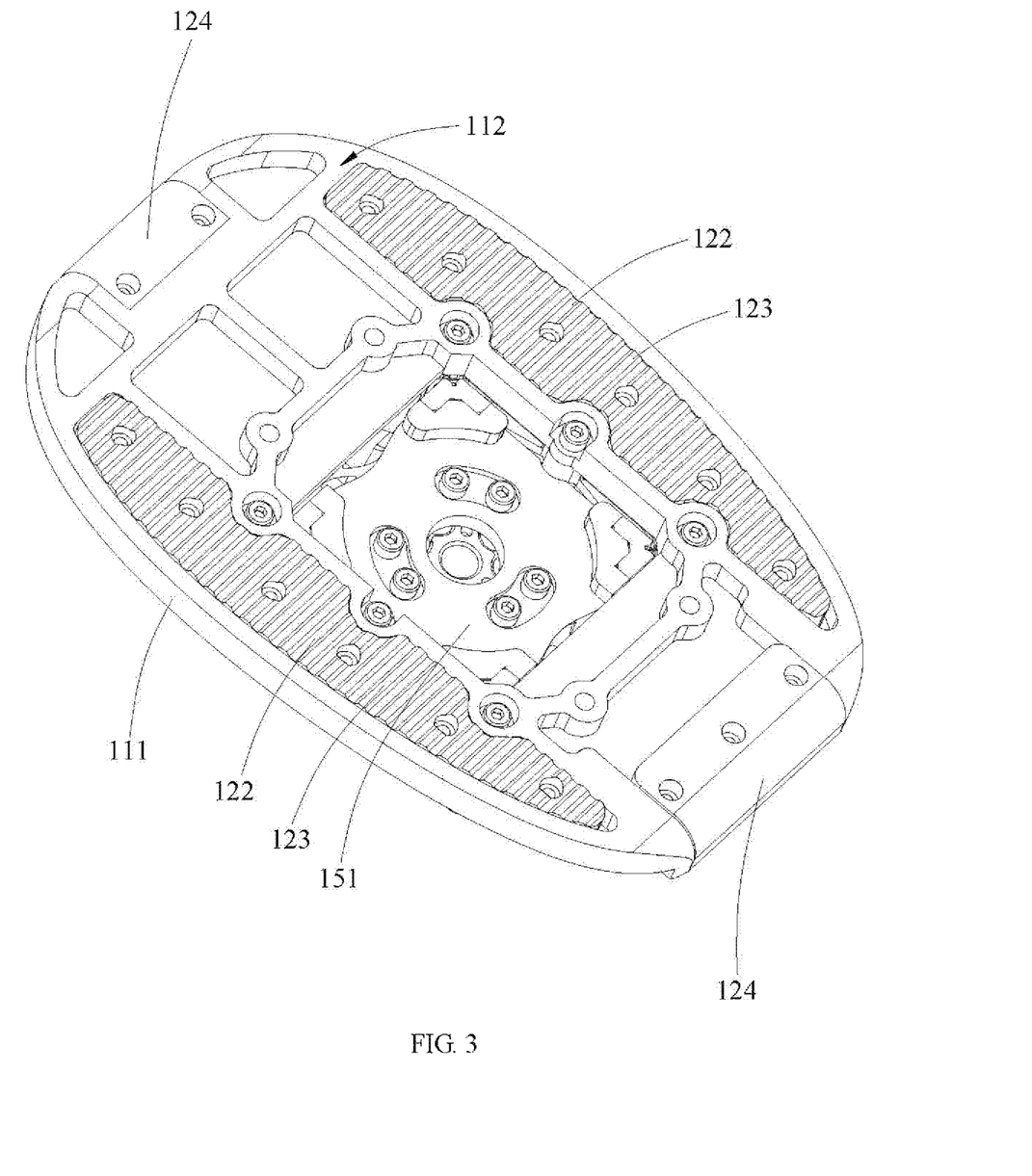
FIG. 3 shows a further perspective view of the robot foot structure in FIG. 1.

Further, as shown in FIGS. 1 to 3, the sole plate 111 includes a ground-contacting surface 112 for being contacted with the ground and a bearing surface 113 for load bearing. The sole plate 111 is bilaterally symmetric along a symmetry plane. Two buffers 121 are provided and fixedly connected to the bearing surface 113. The buffers 121 are arranged behind one another. Each of the buffers 112 has a center point. A line connecting the center points of the buffers 121 is located in the symmetry plane.

In the embodiment, due to the effect of inertia, when the robot foot structure in a first walking state, i.e. the robot foot structure walks forward in an accelerated speed, the center of gravity of the main body structure of the humanoid robot is shifted backward, the portion which an impact resulted from the gravity of the main body structure acts on is shifted backward accordingly. The rear one of the buffers 121 provided on the bearing surface 113 ensures a buffering effect on the robot foot structure in the first walking state, such that the service life of the robot foot structure can be extended.

In the embodiment, due to the effect of inertia, when the robot foot structure in a second walking state, i.e. the robot foot structure walks forward in an decelerated speed, the center of gravity of the main body structure of the humanoid robot is shifted forward, the portion which an impact resulted from the gravity of the main body structure acts on is shifted forward accordingly. The from one of the buffers 121 provided on the bearing surface 113 ensures a buffering effect on the robot foot structure in the second walking state, such that the service life of the robot foot structure can be extended.

In the embodiment, the buffers 121 arranged behind one another meets the buffering requirements for the robot foot structure in different walking states, such that the service life of the robot foot structure can be extended regardless of the walking state of the robot foot structure, and the applicability of the robot foot structure is improved.

Further, the buffering mechanism further includes at least one buffering pad 122 fixedly mounted on the ground-contacting surface 112. The buffering pad 122 is arranged between the sole plate 111 and the ground, such that the buffering pad 122 absorbs an impact resulted from a counterforce applied on the sole plate 111 by the ground during walking of the robot foot structure.

Further, as shown in FIG. 3, two buffering pads 112 are fixedly mounted on the ground-contacting surface 112 of the sole plate 111, and are symmetrically disposed about the symmetry plane. Each buffering pad 112 is provided with a plurality of ribs 123 extending beyond a surface of the sole plate 111. The plurality of ribs 123 are arranged to be spaced apart from each other.

In the embodiment, when the portion which an impact acts on of the sole plate 111 is shifted left or right during walking of the robot foot structure, the two buffering pads 122 symmetrically disposed about the symmetry plane can avoid the buffering effect being weakened in this case, resulting in improved applicability of the robot foot structure. A distance provided between two adjacent ribs 123 ensures an enough space for the deformation of the ribs 123, such that the buffering effect of the buffering pad 122 can be enhanced. By this way, the service life of the robot foot structure can be extended.

Figure 4:
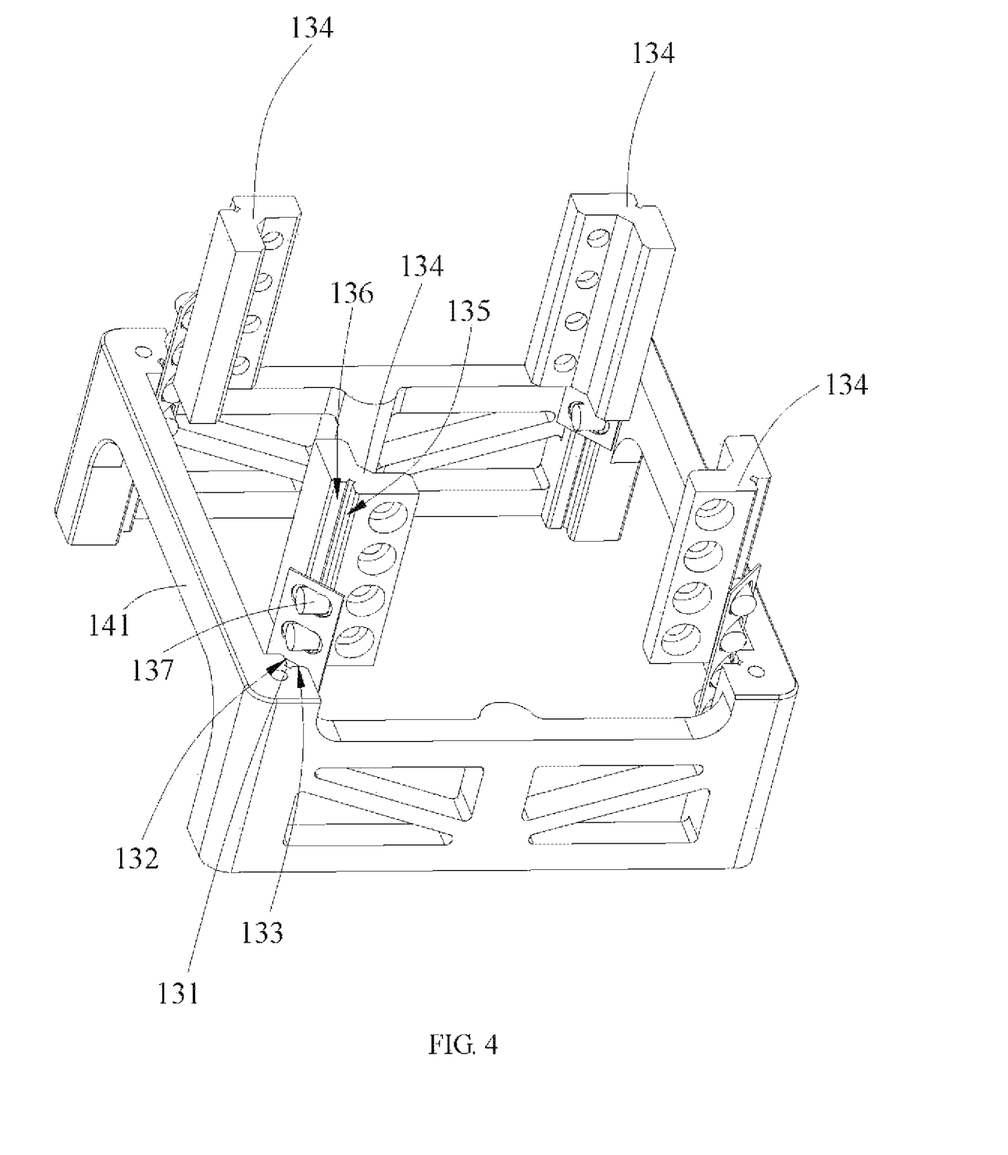
FIG. 4 shows a perspective view of a guide frame and a guiding assembly according to an embodiment of the present application.

Further, as shown in FIGS. 1, 2 and 4, the robot foot structure further includes a guiding assembly and a guide frame 141 on the bearing surface 113 fixedly connected with the sole plate 111. The guiding assembly includes a moving block 134 fixedly connected with the buffer 121, and a guiding track 131 provided at the guide frame 141 and in guiding engagement with the moving block 134. The guiding track 131 is formed integrally or separately with the guide flame 141 and extends perpendicularly to the bearing surface 113 along a straight line. The moving block 134 is located in a cavity 142 enclosed by the guide frame 141 and is slidable on the guiding track 131 to move the buffer 121 up and down straightly.

In the embodiment, the moving block 134 is fixedly connected with the buffer 121 and in guiding engagement with the guiding track 131 which extends perpendicularly to the bearing surface 113 along a straight line. In this way, the buffer 121 perform a damping movement when the impact resulted from the gravity of the main body structure during walking of the robot foot structure is absorbed by the buffer 121, and the guiding engagement between the moving block 134 and the guiding track 131 ensures a straightness of the damping movement of the buffer 121, such that the main body structure of the humanoid robot is prevented from shaking, and the stability of the main both structure during walking of the robot foot structure is improved.

Further, as shown in FIG. 4 the guiding assembly further includes a plurality of rollers 137 provided between the guiding track 131 and the moving block 134. The guiding track 131 has a first guiding surface 132 and a second guiding surface 133 intersecting with each other. The moving block 134 includes a first mating surface 135 facing to the first guiding surface 132 and extending in a same direction as the first guiding surface 132, and a second mating surface 136 facing to the second guiding surface 133 and extending in a same direction as the second guiding surface 133. Each of the rollers 137 has two planar end faces abutting the first guiding surface 132 and the first mating surface 135 respectively, and a side face abutting the second guiding surface 133 and the second mating surface 136.

In the embodiment, each of the rollers 137 has two planar end faces abutting the first guiding surface 132 and the first mating surface 135 respectively, and a side face abutting the second guiding surface 133 and the second mating surface 136, such that the rigidity of the robot foot structure can be improved, and thus the service life of the robot foot structure can be extended.

Further, as shown in FIG. 4, the first guiding surface 132 and the second guiding surface 133 are each provided as planar, and the first mating surface 135 and the second mating surface 136 are each provided as planar. The first mating surface 135 is parallel with the first guiding surface 132, and the second mating surface 136 is parallel with the second surface 133.

Further, the first guiding surface 132 and the first mating surface 135 are each provided as cambered, and the second guiding surface 133 and the second mating surface 136 are each provided as planar. The first guiding surface 132 and the first mating surface 135 protrude toward each other, and the second mating surface 136 is parallel with the second guiding surface 133.

In the embodiment, the two planar end faces of each roller 137 abuts the first guiding surface 132 and the first mating surface 135 respectively, and the first guiding surface 132 and the first mating surface 135 are each provided as cambered, such that, during the damping movement of the buffer 121, frictions between the rollers 137 and the guiding track 131 and between the rollers 137 and the moving block 134 can be reduced, and thus wearing of material between the rollers 137 and the guiding track 131 and between the rollers 137 and the moving block 134 can be reduced. In this way, generation of gaps between the rollers 137 and the guiding track 131 and between the rollers 137 and the moving block 134 can be greatly reduced. Thus, the rollers 137 can be prevented from rigidly colliding with the guiding track 131 and the moving block 134 during the damping movement of the buffer 121, such that the rigidity of the robot foot structure can be improved, and thus the service life of the robot foot structure can be extended.

Further, as shown in FIGS. 1 and 2, the robot foot structure further includes a retaining frame 151 fixedly connected with the buffer 121 to transfer the load to the buffer 121, and a force sensor unit 161 for bearing the load and transferring the load to the retaining frame 151. The retaining frame 151 is located below the guide frame 141 and is arranged in form fit manner with respect to the guide frame 141. The force sensor unit 161 is inserted into the cavity 142 and fixedly connected to the retaining frame 151. The moving block 134 is fixedly mounted on the lateral of the retaining frame 151. The moving block 134 is fixedly connected to the buffer 121 via the retaining frame 151.

Further, the buffering mechanism further includes buffer patches 124 attached to a front end and a rear end of the sole plate 111 respectively.

Figure 5:
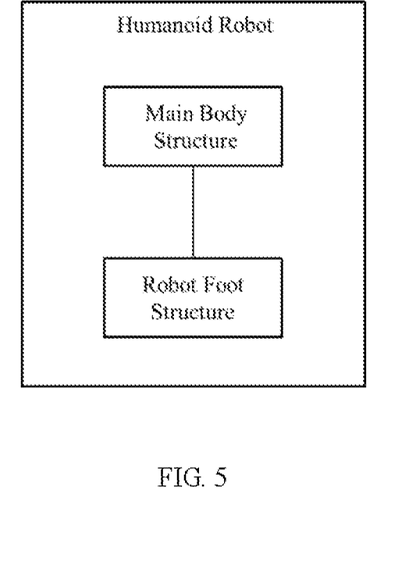
FIG. 5 shows a schematic view of a humanoid robot according to an embodiment of the present application.

In a further embodiment of the present application, a humanoid robot is provided, including the robot foot structure as stated above and a main body structure connected with the robot foot structure, as shown in FIG. 5.

Described above are only preferred embodiments of the present application, and any equivalent changes and modification made within the scope of the claims of the present application shall be covered by the scope of the claims of the present application.

What is claimed is:

1. A robot foot structure for being used in conjunction with a main body structure of a humanoid robot, the robot foot structure being configured to be connected to a bottom of the main body structure, wherein the robot foot structure comprises a sole plate and a buffering mechanism provided on the sole plate, the buffering mechanism is configured to be connected between the sole plate and the main body structure of the humanoid robot for buffering a load acted on the robot foot structure generated by the weight of the main body structure during walking of the robot foot structure, wherein the robot foot structure further comprises a guide frame fixedly connected with the sole plate and a moving block movable relative to the sole plate, wherein a plurality of rollers are provided between the guide frame and the moving block.

2. The robot foot structure according to claim 1, wherein the buffering mechanism comprises at least one buffer for buffering a compressional force between the main body structure of the humanoid robot and the sole plate, and the at least one buffer comprises a lower part fixedly connected to the sole plate and an upper part connected to the main body structure and configured to perform a damping movement with respect to the lower part.

3. The robot foot structure according to claim 2, wherein the robot foot structure comprises a ground-contacting surface for being contacted with the ground and a bearing surface for load bearing, the sole plate is bilaterally symmetric along a symmetry plane, the at least one buffer includes two buffers provided and fixedly connected to the bearing surface, the buffers are arranged behind one another, each of the buffers has a center point, a line connecting the center points of the buffers is located in the symmetry plane.

4. The robot foot structure according to claim 3, wherein the robot foot structure further comprises a guiding assembly and the guide frame on the bearing surface fixedly connected with the sole plate, the guiding assembly comprises the moving block fixedly connected with the buffers, and a guiding track provided at the guide frame and in guiding engagement with the moving block, the guiding track is formed integrally or separately with the guide frame and extends perpendicularly to the bearing surface along a straight line, the moving block is located in a cavity enclosed by the guide frame and is slidable on the guiding track to move the buffer up and down straightly.

5. The robot foot structure according to claim 4, wherein the robot foot structure further comprises the plurality of rollers provided between the guiding track and the moving block, the guiding track has a first guiding surface and a second guiding surface intersecting with each other, the moving block comprises a first mating surface facing to the first guiding surface and extending in a same direction as the first guiding surface, and a second mating surface facing to the second guiding surface and extending in a same direction as the second guiding surface, each of the rollers has two planar end faces abutting the first guiding surface and the first mating surface respectively, and a side face abutting the second guiding surface and the second mating surface.

6. The robot foot structure according to claim 5, wherein the first guiding surface and the second guiding surface are each provided as planar, and the first mating surface and the second mating surface are each provided as planar, the first mating surface is parallel with the first guiding surface, and the second mating surface is parallel with the second guiding surface.

7. The robot foot structure according to claim 5, wherein the first guiding surface and the first mating surface are each provided as cambered, and the second guiding surface and the second mating surface are each provided as planar, the first guiding surface and the first mating surface protrude toward each other, and the second mating surface is parallel with the second guiding surface.

8. The robot foot structure according to claim 4, wherein the robot foot structure further comprises a retaining frame fixedly connected with the buffers to transfer a load to the buffers, and a force sensor unit for bearing the load and transferring the load to the retaining frame, the retaining frame is located below the guide frame and is arranged in form-fit manner with respect to the guide frame, the force sensor unit is inserted into the cavity and fixedly connected to the retaining frame, the moving block is fixedly mounted on the lateral of the retaining frame, the moving block is fixedly connected to the buffer via the retaining frame.

9. The robot foot structure according to claim 3, wherein the buffering mechanism further comprises at least one buffering pad fixedly mounted on the ground-contacting surface, the at least one buffering pad is provided between the sole plate and the ground.

10. The robot foot structure according to claim 9, wherein the at least one buffering pad includes two buffering pads which are fixedly mounted on the ground-contacting surface of the sole plate and are symmetrically disposed about the symmetry plane, each buffering pad is provided with a plurality of ribs extending beyond a surface of the sole plate, the plurality of ribs are arranged to be spaced apart from each other.

11. The robot foot structure according to claim 9, wherein the buffering mechanism further comprises buffer patches attached to a front end and a rear end of the sole plate respectively.

12. A humanoid robot, comprising a main body structure and a robot foot structure connected with the main body structure, wherein the robot foot structure comprises a sole plate and a buffering mechanism provided on the sole plate, the buffering mechanism is configured to be connected between the sole plate and the main body structure of the humanoid robot for buffering a load acted on the robot foot structure generated by the weight of the main body structure during walking of the robot foot structure, wherein the robot foot structure further comprises a guide frame fixedly connected with the sole plate and a moving block movable relative to the sole plate, wherein a plurality of rollers are provided between the guide frame and the moving block.

\* \* \* \* \*